United States Patent [19]

Hamazaki

[11] Patent Number: 5,043,881
[45] Date of Patent: Aug. 27, 1991

[54] SESSION CONTROL METHOD FOR REWRITING INFORMATION IN A SESSION CONTROL DEVICE IN AN INTERACTIVE PROCESSING SYSTEM

[75] Inventor: Takashi Hamazaki, Kamakura, Japan
[73] Assignee: Hitachi, Ltd., Tokyo, Japan
[21] Appl. No.: 847,303
[22] Filed: Apr. 2, 1986

[30] Foreign Application Priority Data

Apr. 3, 1985 [JP] Japan .................. 60-68947

[51] Int. Cl.⁵ .................. G06F 15/00; G06F 13/00
[52] U.S. Cl. .................. 364/200; 364/284; 364/284.4; 364/281.3; 364/281.8; 379/211
[58] Field of Search ... 364/200 MS File, 900 MS File; 379/57, 211

[56] References Cited

U.S. PATENT DOCUMENTS

| 4,178,476 | 12/1979 | Frost | 379/57 X |
|---|---|---|---|
| 4,262,283 | 4/1981 | Chamberlain et al. | 340/533 |
| 4,313,035 | 1/1982 | Jorden et al. | 379/211 |
| 4,451,705 | 5/1984 | Burke et al. | 379/211 |
| 4,503,499 | 3/1985 | Mason et al. | 364/200 |
| 4,586,134 | 4/1986 | Norstedt | 364/200 |
| 4,658,351 | 4/1987 | Teng | 364/300 |
| 4,658,416 | 4/1987 | Tanaka | 379/57 |
| 4,718,005 | 1/1988 | Feigenbaum et al. | 364/200 |

FOREIGN PATENT DOCUMENTS 60-14342 1/1985 Japan .

Primary Examiner—Thomas C. Lee
Attorney, Agent, or Firm—Antonelli, Terry, Stout & Kraus

[57] ABSTRACT

In an interactive processing system, a session between a terminal device and a task is not fixed, but can be changed to another session before it is completed. The interactive processing system stores information representing the session set for each of a plurality of users and the session to be processed by each of the terminal devices. This information is changed by the instruction from the terminal device. When an input-output operation is effected with a terminal device in the execution of a task, it is effected with the terminal device which is designated by the information.

3 Claims, 11 Drawing Sheets

FIG. 4

PROFILE TABLE

| USER NAME | COMPETENCE LEVEL | CONTROL INFORMATION | CONTROL INFORMATION |
|---|---|---|---|
|  |  |  |  |
| ⋮ | ⋮ | ⋮ | ⋮ |
|  |  |  |  |

FIG. 12a

USER A     SESSION 1 ⟶ SESSION 2 ⟶ SESSION 1

TERMINAL DEVICE a

FIG. 12b

USER A     SESSION 1 ⟶ X

TERMINAL DEVICE a

USER A             ⟶ SESSION 1

TERMINAL DEVICE b

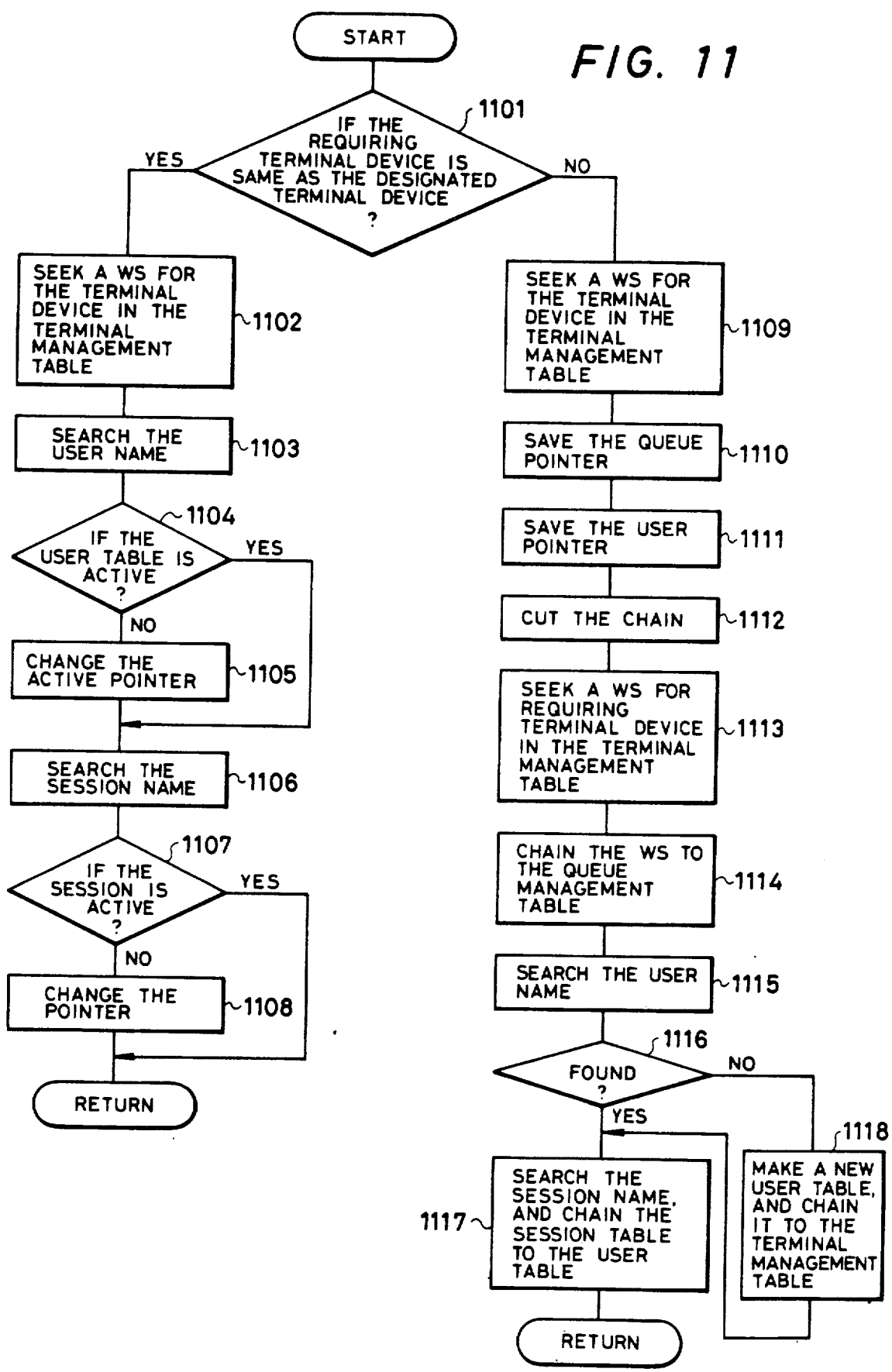

SESSION CONTROL METHOD FOR REWRITING INFORMATION IN A SESSION CONTROL DEVICE IN AN INTERACTIVE PROCESSING SYSTEM

BACKGROUND OF THE INVENTION

1. Field of the Invention

This invention relates to a control method of sessions in an interactive processing system.

2. Description of the Prior Art

In a conventional interactive processing system, the correspondence relation between a task (user program) and a terminal device used for the execution of the task is fixed on a one-to-one basis. A prior art system disclosed in Japanese Patent Laid-Open No. 40661/1983 makes it possible to execute concurrently a plurality of sessions by introducing the concept "virtual terminal". Though virtual, this concept does not get out from the conventional concept that information specifying a terminal is assigned to a session through the execution of the session. For this reason, it is not possible by this prior art system to achieve the following processing.

1) In a case of one session being processed by using a terminal device, another session is processed instead of the one session by using the terminal device before the processing for the one session has been completed.

2) In a case of a session being processed by using a terminal device, the session is processed by using another terminal device, before the processing for the session has been completed.

SUMMARY OF THE INVENTION

The present invention therefore contemplates to provide a session control system in an interactive processing system which eliminates the problems of the prior art systems described above.

The present invention provides memory means for storing information representing the correspondence relation between a terminal device and a task, updates the information in accordance with the request from a terminal device and specifies a terminal device to be used for the execution of the task in accordance with the information which represents the correspondence relation.

BRIEF DESCRIPTION OF THE DRAWINGS

FIG. 4 is a diagram showing an example of profile tables;

FIG. 11 is a flow chart showing the processing for terminal control for changing sessions;

FIG. 12a is a flow chart showing an example of session alteration; and

FIG. 12b is a flow chart showing another example of session alteration.

DESCRIPTION OF THE PREFERRED EMBODIMENTS

Hereinafter, preferred embodiments of the present invention will be described with reference to the accompanying drawings.

Figure 1:
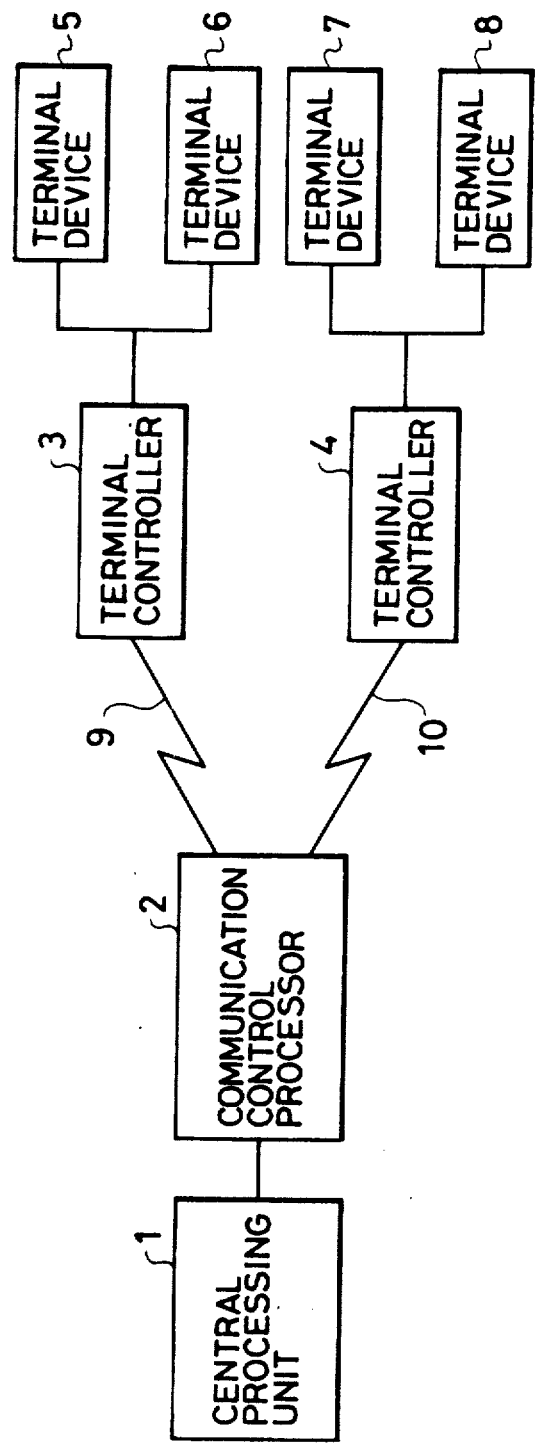
FIG. 1 is a schematic structural view of an electronic computer system to which the present invention is applied.

FIG. 1 shows the overall construction of an electronic computer system to which the present invention is adapted. The system consists of a central processing unit 1, a communication control processor 2, terminal controllers 3 and 4 connected to the communication control processor 2 through lines 9 and 10, respectively, and terminal devices 5, 6, 7, and 8 connected to the terminal controllers 3 and 4, respectively.

In the electronic computer system having the construction described above, processings are executed while the input-output operation are being effected in the processing control unit 1 (CPU) with respect to the terminal devices 5 to 8. Such processings are referred to as "interactive processing" and a bunch of processings are referred to as a "task".

Figure 2:
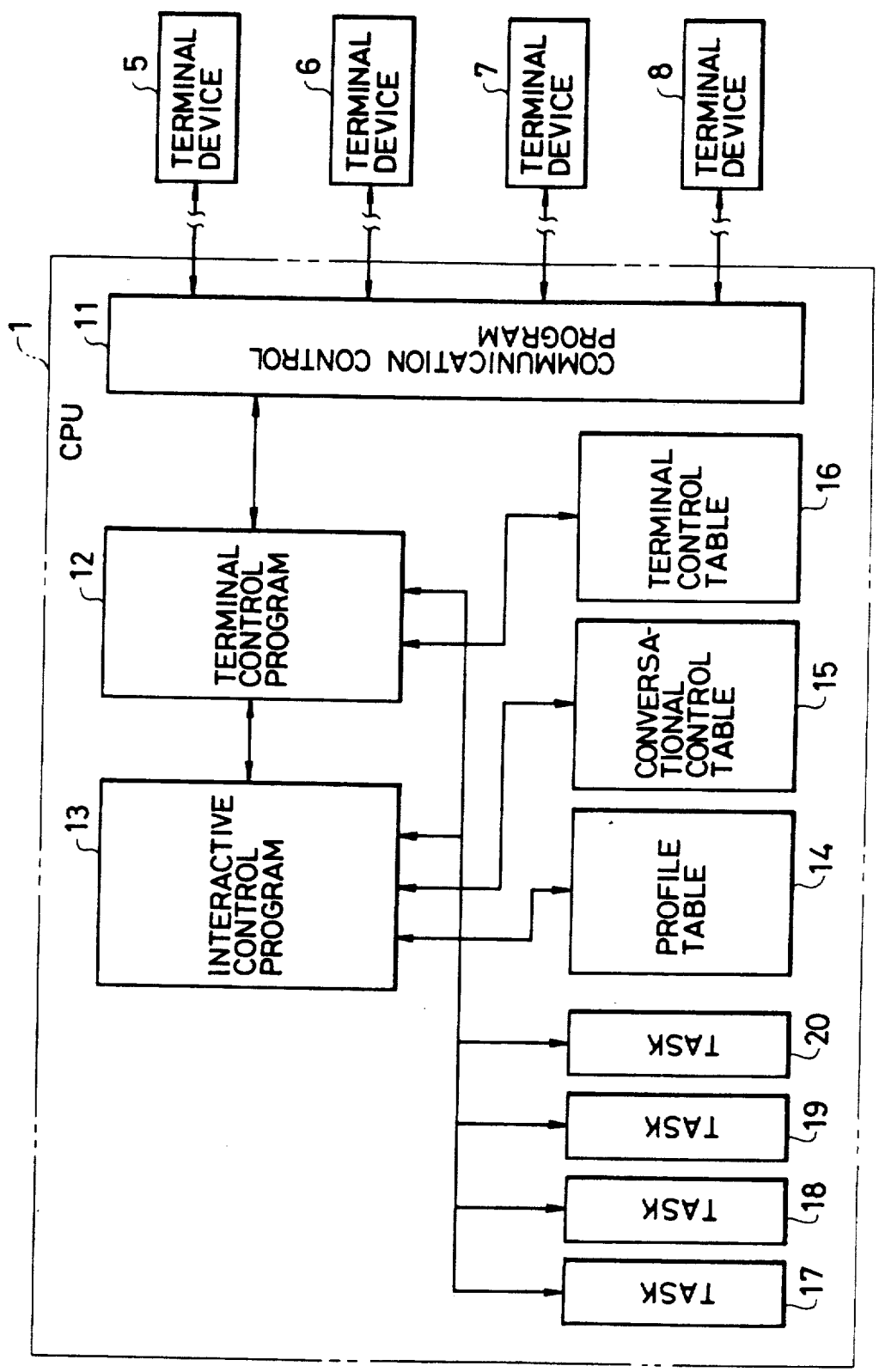
FIG. 2 is a block diagram showing one embodiment of the present invention.

FIG. 2 is a schematic functional block diagram of CPU 1 in the embodiment of the present invention. A plurality of tasks are executed in CPU 1. A session which is a processing between one of the terminal devices and a task for which the interactive processing is to be made, is assigned in order to execute the input-output operation with the terminal device. Conventionally, this session has been fixed and cannot be reassigned before the processing of the task is completed. The present invention makes it variable.

In FIG. 2, a communication control program 11 controls the data transmission and reception between CPU 1 and the terminal devices, and has the same function as that of the prior art system. A terminal control program 12 and an interactive control program 13 control the input-output operations between CPU 1 and the terminal devices that occur during the process of execution of the task, while using a profile table 14, a conversational control table 15 and a terminal control table 16.

Since the present invention relates essentially to the control of sessions in the interactive processing, the description of the other unassociated constructions will be omitted.

Figure 3:
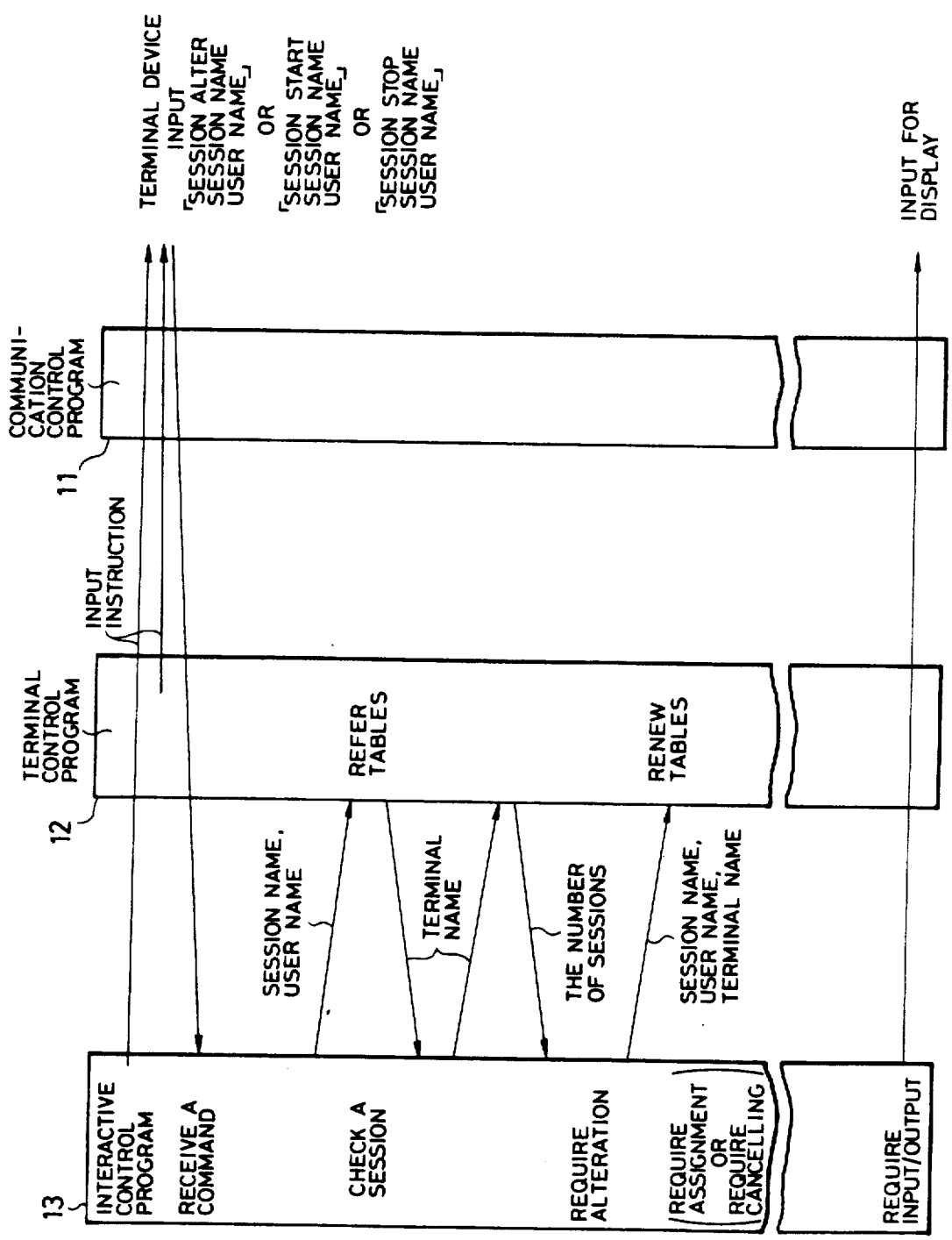
FIG. 3 is a diagram showing an outline of processing in one embodiment of the invention.

FIG. 3 schematically shows the processing of the present invention in relation to the session control.

A command relating to a session is inputted from an terminal device in response to the input instruction from the interactive control program or the terminal control program. The description on input of other commands and data will be hereby omitted.

A session name and a user name are applied to the command "SESSION START" and then inputted or applied to the interactive control program 13 through the communication control program 11 and the terminal control program 12 and are accepted there. In a status of the session start, the session start command is inputted in response to activation of the interactive control program with designation of a terminal device so, the interactive control program can know from which terminal device the command is issued. Therefore, the interactive control program sends the terminal name to the terminal control program and inquires the session number set to the terminal device at the time. Since the terminal control program stores therein the upper limit value of the session number as will be described below, it replies on the basis of this memory content. As will be described below, the interactive control program stores also the upper limit value of the session number that can be assigned to each of the terminal devices, and compares this number of sessions with the stored value. If further assignment is possible, the interactive control program sends the session name, the user name and the terminal name and issues session assignment. The terminal control program rewrites the table managing the sessions and sets a new session.

If an input-output requirement is raised, data is displayed on the corresponding terminal device in accordance with the assigned session, or the data is inputted from the terminal device.

Next, an explanation will be made for the cases where a "SESSION ALTER" command is inputted together with the session name and the user name and where a "SESSION STOP" command is inputted together with the session name and the user name. Since these cases correspond to the status where the session has already been assigned, input-output activation is generated from the terminal control program. Upon receiving the commands, the interactive control program inquires the terminal name of the terminal control program while inputting the user name and the session name.

The terminal control program searches the terminal control table for the terminal name and returns the terminal name. The subsequent processings are the same as those of the "SESSION START" command before an alteration requirement or a cancel requirement is generated. Thereafter, the alteration requirement and the cancel requirement are generated on the interactive control program, and the terminal control program updates the table in response thereto.

The above explains the overall construction and an example of the operations relating to the session control method of the present invention.

Hereinafter, the present invention will be explained in further detail.

FIG. 4 shows a profile table 14 inside CPU 1. This table is prepared at the time of constituting the system. The table stores the user name, the competence level (general or privileged) given to that user, and other control information.

Figure 5:
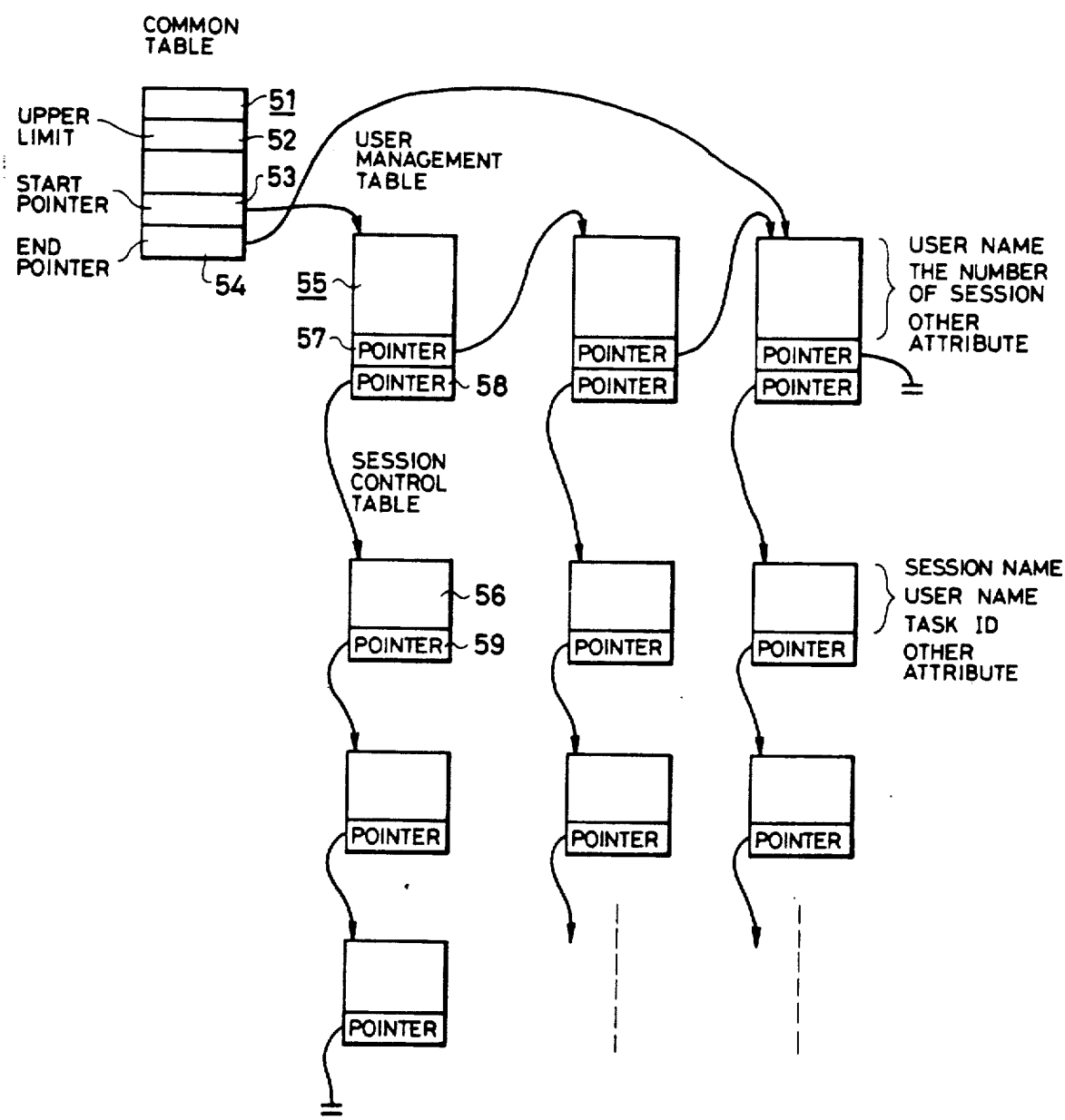
FIG. 5 is a diagram showing an example of interactive control tables.

FIG. 5 shows in detail the conversational control table 15. A common table 51 is a table to which direct reference is made by the conversational control program, and stores the upper limit value 52 described above, the start pointer 53 for a first user management table 55 and end pointer 54 for a last user management table 55. The user management table 55 has the user name, the assigned number of sessions and other user attributes, a pointer 57 to the other user management tables and a pointer 58 to a session control table. The user management tables are chained to one another by the pointers 57. The session control tables 56 are pointed to from the user management tables 55, are mutually chained and store the session name, the user name, the task ID and other attributes.

Figure 6:
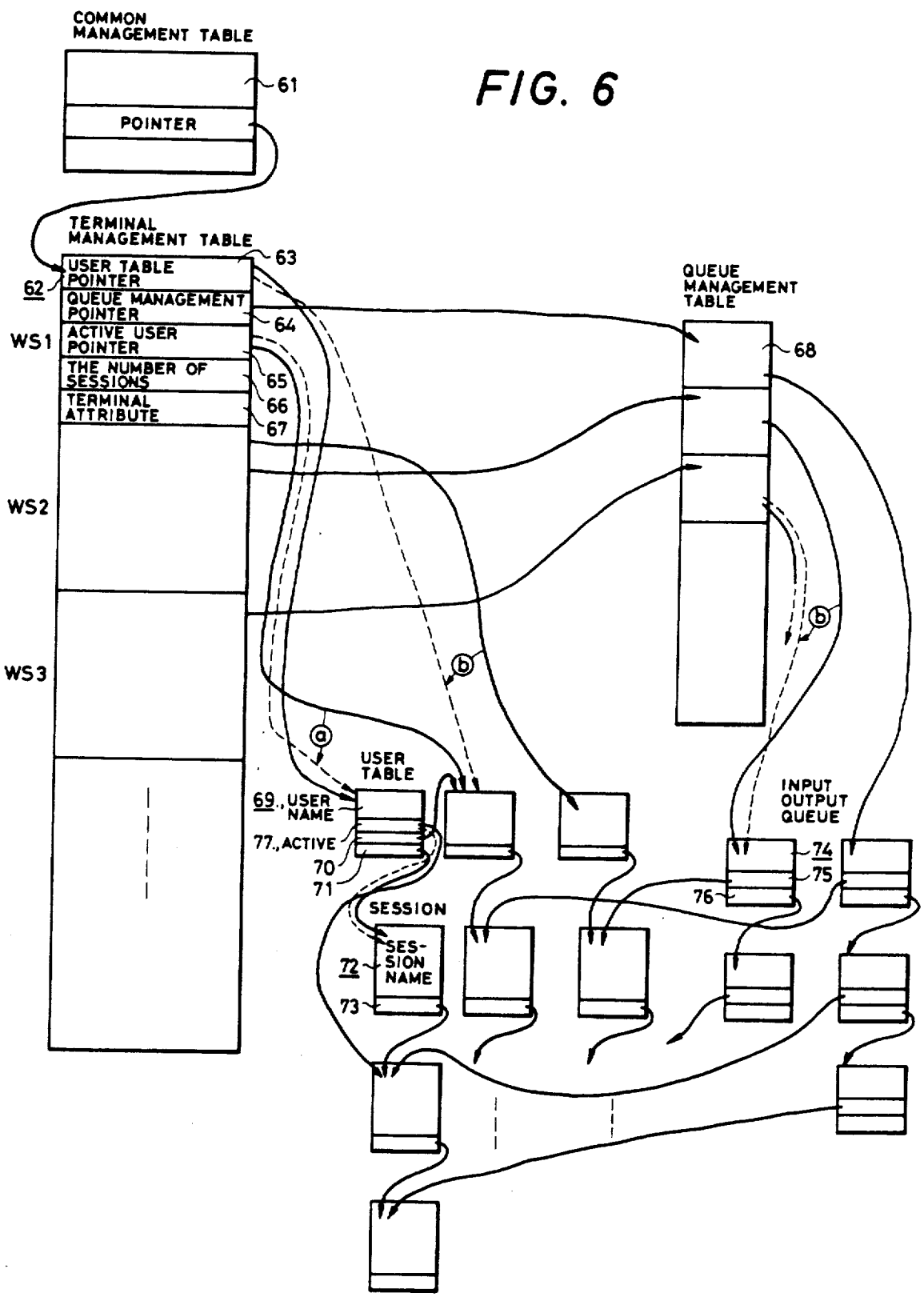
FIG. 6 is a diagram showing an example of terminal control tables.

FIG. 6 shows in detail a terminal control table. A common management table 61 is a table to which direct access is made from the terminal control program, and which contains a pointer for the terminal management table 62. The terminal management table 62 has areas (WS1, WS2, WS3, ...) for the terminal devices, and these areas store the user table pointer 63, a queue management pointer 64, an active user pointer 65 representing the session that utilizes the terminal device at present, a session number 66 assigned to that terminal, and terminal attributes (such as identification of printer, display, and the like) 67. The user table 69 is pointed to by the pointer 63 and the session table 72 is pointed by the pointer 71. The session tables store the session name and are mutually chained by the pointer 73.

When two or more sessions of a plurality of users are assigned to one terminal device, the user tables 69 are chained by the pointer 70. On the other hand, a queue management table 68 is provided. This table 68 has areas corresponding to the terminal devices, respectively, and points to an input-output queue 74. The input-output queue 74 represents the execution of the input-output processing executed by the terminal device or the waiting sequence, and is chained to the other queues 74 by the pointer 76. The session table 72 is pointed to by the pointer 75 from each table of the input-output queue, thereby designating the session to be executed.

The above explains the constructions of the tables used for the main processing. Next, the session control processing using these tables will be described in detail.

Initially, the session alteration processing will be described. When the "SESSION ALTER" command is generated as shown in FIG. 3, the conversational control program 13 starts processing shown in FIG. 8. First, the "SESSION ALTER" command is received (801) and the competence level is searched from the given user name by referring to the profile table shown in FIG. 4 so as to check the competence for use of the terminal device by that user (802). Next, the conversational control table shown in FIG. 5 is referred to by referring to the common table 51 and searching the user management table 55 by the pointer 53. The pointer is the first address of the table that is to be referred to next. The table storing the same user name as the user name given by the pointer 57 is searched. Then, the session control table 56 is searched by the pointer 58 and the existence of the table storing the same session name as the session name given by the session control table is confirmed (803). If not, it is an error. If the session exists, the user name and the session name are sent to the terminal control program, and the name of the terminal used by the user is inquired (804).

Figure 9:
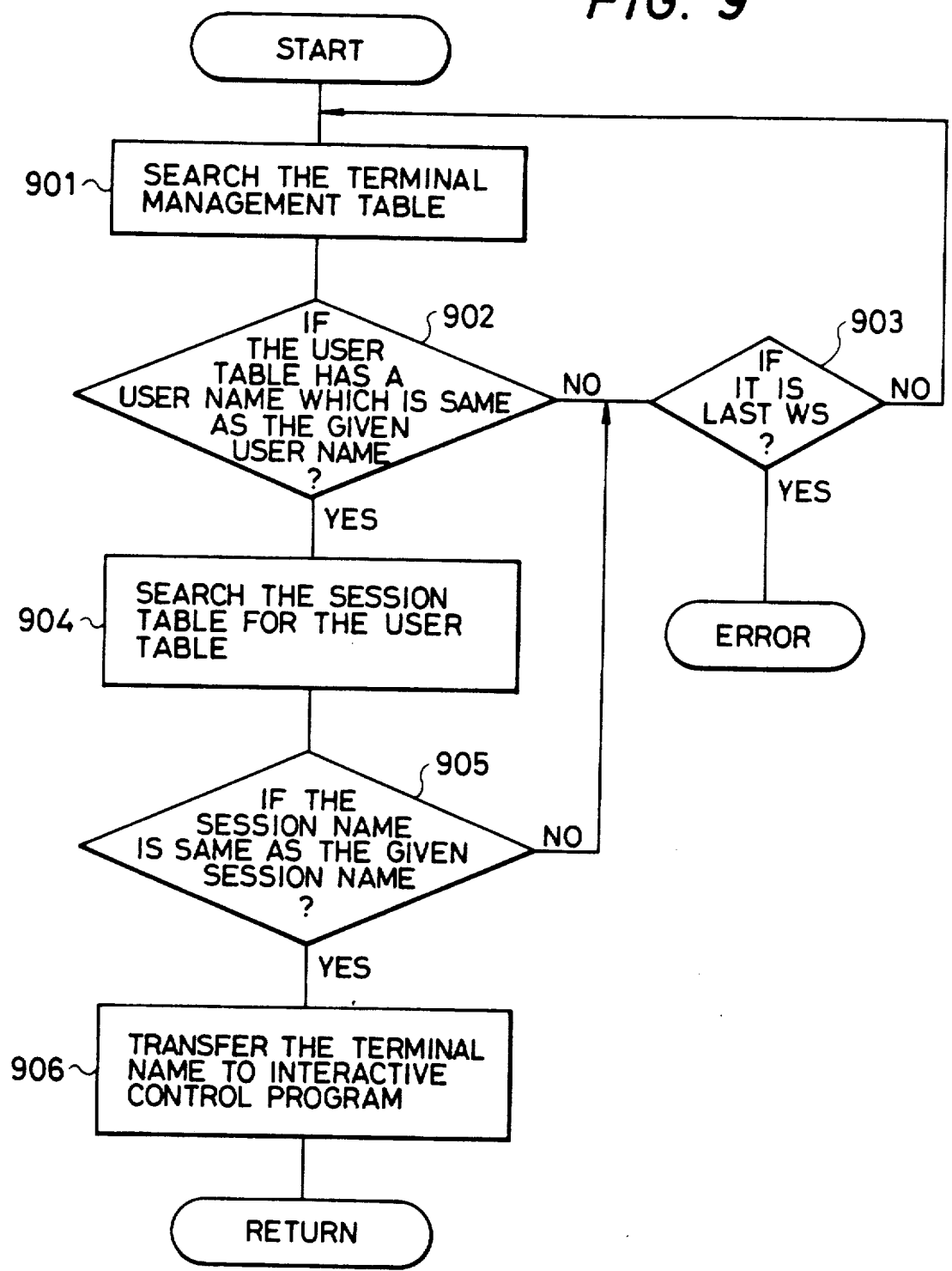
FIG. 9 is a flow chart showing the processing of the terminal same search.

FIG. 9 shows the processing of the terminal control program for this inquiry. Initially, reference is made to the area WS1 for the first terminal device of the terminal management table, and the user table 69 pointed by it is searched (901). Then, it is checked whether the table having the given user name is there (902). If not, the same processing is executed for the area WS2 relating to the next terminal device (903). If the table having the same session name is found, the session table 72 connected to that user table is searched (904). Whether or not the session name is in agreement with the given session name is in agreement checked, and if it is, the terminal device name at that time is sent to the conversational control program. If the table having the same session name does not exist, the processing returns to step 903.

Figure 8:
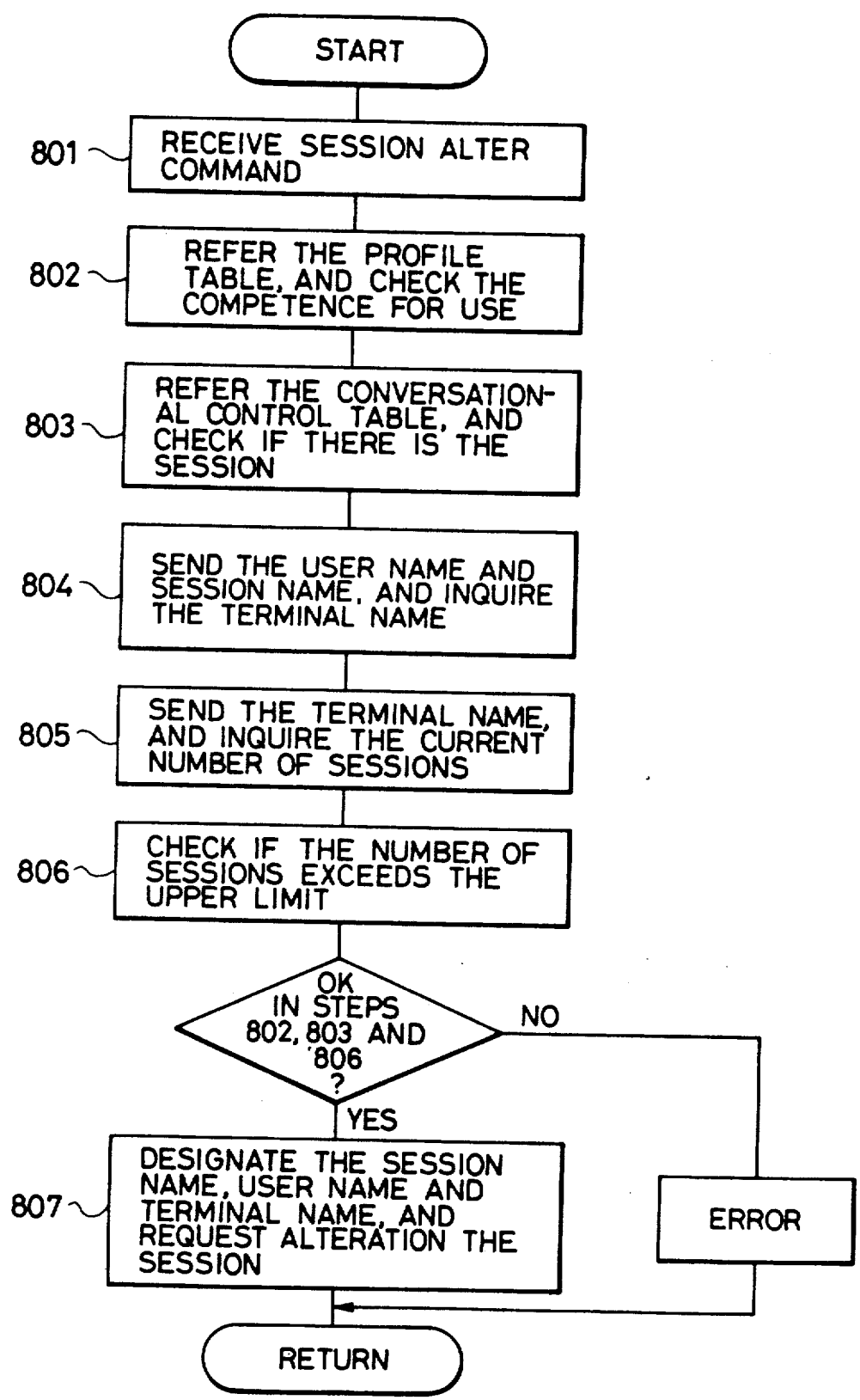
FIG. 8 is an interactive control flow chart for changing sessions.

Turning back again to the processing shown in FIG. 8, the conversational control program inquires the current session number of the terminal control program on the basis of the terminal name it receives (805).

Figure 10:
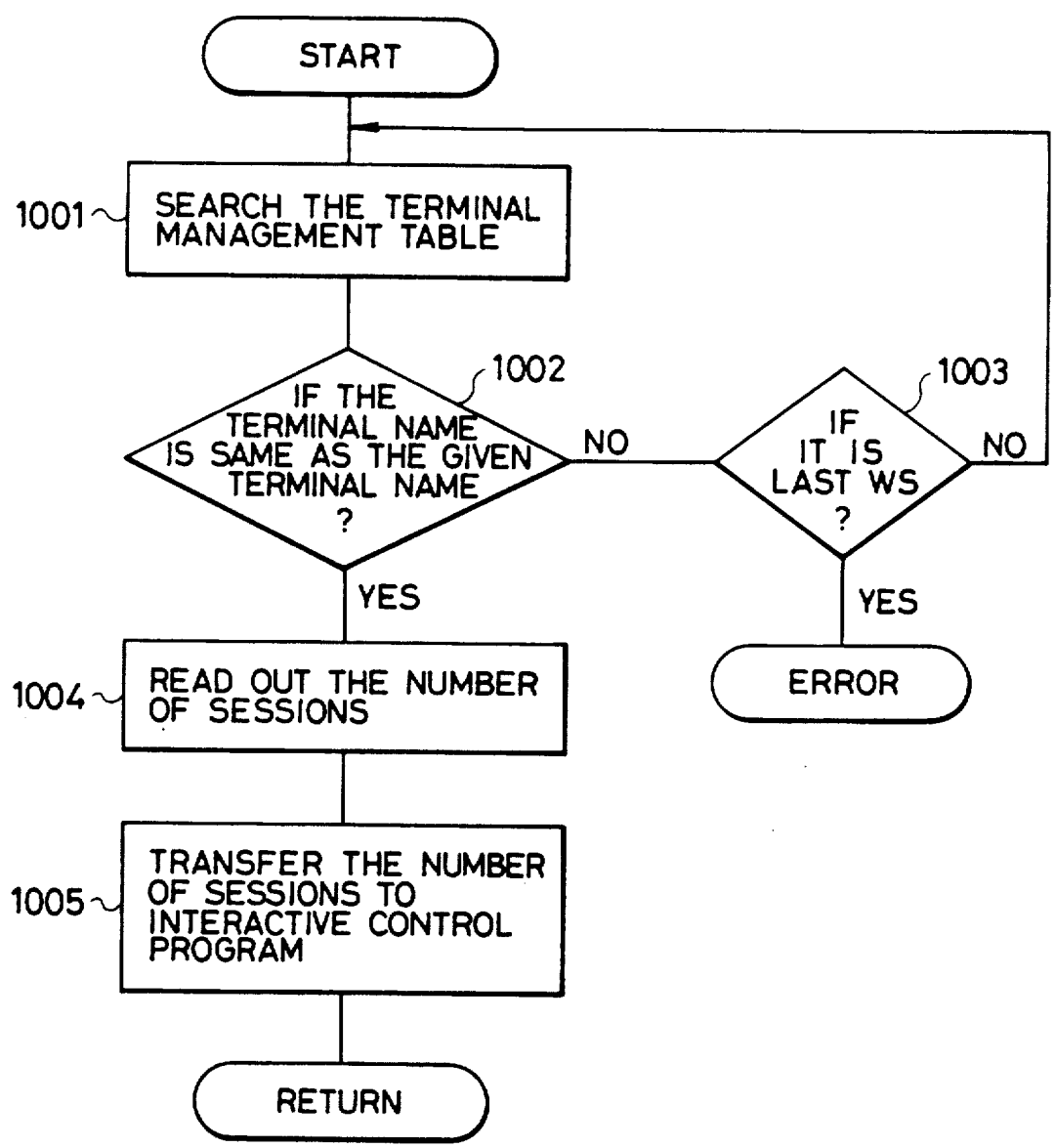
FIG. 10 is a flow chart showing the processing for the session number search.

Here, the processing of the terminal control program shown in FIG. 10 is executed. When the inquiry described above is received, the terminal management table 62 is searched (1001), and when the area corresponding to the given terminal name is found, the session number stored therein is read (1002, 1004). If the area is not the corresponding area, the next area is searched (1003). The session number that is read and is assigned currently to that terminal is sent to the conversational control program. Returning to FIG. 8, whether the session number exceeds the upper limit value 52 in the common table 51 in FIG. 5 is checked (806). If all the checks at steps 802, 803 and 806 prove to be YES, the session name, the user name and the terminal device name are designated and a session alteration request is issued to the terminal control program (007). If they are not YES, it is an error.

How the session alteration request occurs will be explained before the description of the session alteration processing. FIG. 12a shows an example of such cases. The session alteration occurs when the user A executes processing relating to the session 1 using the terminal a and executes the processing for another session 2 before the task is completed for the session 1, and returns again the processing to the processing for the session 1. FIG. 12b shows a case where the problem occurs at the terminal a and the session 1 must be transferred to the terminal b when the user A executes processing for the session 1 using the terminal a.

FIG. 11 shows the processing of the terminal control program in response to the session alteration request.

Initially, whether the terminal device which sends the command is in agreement with the terminal device given, by the conversational control program is determined (1101). If the former is in agreement with the latter, it is the case such as shown in FIG. 12a and if they are not in agreement, it is the case such as shown in FIG. 12b. If they are in agreement, the terminal management table 62 shown in FIG. 6 is searched (1102). If the area corresponding to the given terminal is found, the user table is searched by the pointer 63 to search the user table which is in agreement with the given user name (1103).

Next, whether this user table is active is checked (1104). The term "active" hereby means that the terminal device is used by the user. In the case of FIG. 12a, the user table is active. When one terminal device is to be used in common by at least two users and the other users are active, the user in question is not active. If the user is not active, an active pointer is changed. In the example shown in FIG. 6, the pointer 65 points to the user table as represented by the solid line. When the table name of the user table represented by a dotted line is designated, the pointer is changed from a solid line to a dotted line as represented by symbol (a) (1105).

More definitely, the value of the pointer 65 is rewritten from the start address of the user table represented by a solid line to the start address of the user table represented by a dotted line. Next, the session table connected to that table is searched to find out the session table having the given session name (1106). Next, if it is active is checked (1107). Whether it is active is represented by a user table active pointer 77. If the first session table is designated from the second session table that has been pointed to, for example, the pointer is changed so as to establish the connection represented by a dotted line in the drawing (1108).

Returning to the start of processing, the case where the requiring terminal device is not in agreement with the designated terminal device will be described.

The area relating to the terminal device designated from the conversational control program is searched on the terminal management table (1109). As can be understood clearly from the description given above, the designated terminal device is one that corresponds to the user name and the session name before the change. Next, the pointer for the input-output queue of the queue management table corresponding to the area is saved (1110), the user table pointer 63 is saved (1111) and the chain is cut (1112). Next, the area in the terminal management table corresponding to the requiring terminal device (generating the command) is searched (1113). The queue pointer saved in the queue management table corresponding to that terminal device is set (1114). If the designated user name exists in the user table connected to the terminal device area searched in step 1113, it is examined (1115), and if it does not exist, a new user table is prepared and a chain to the table is prepared (1118). If the user name exists or after the new user table is prepared, the session table having the give session name is searched and is changed to the user table described above (1117). Thus, the change represented by symbol (b) is executed in FIG. 6, for example.

Figure 7:
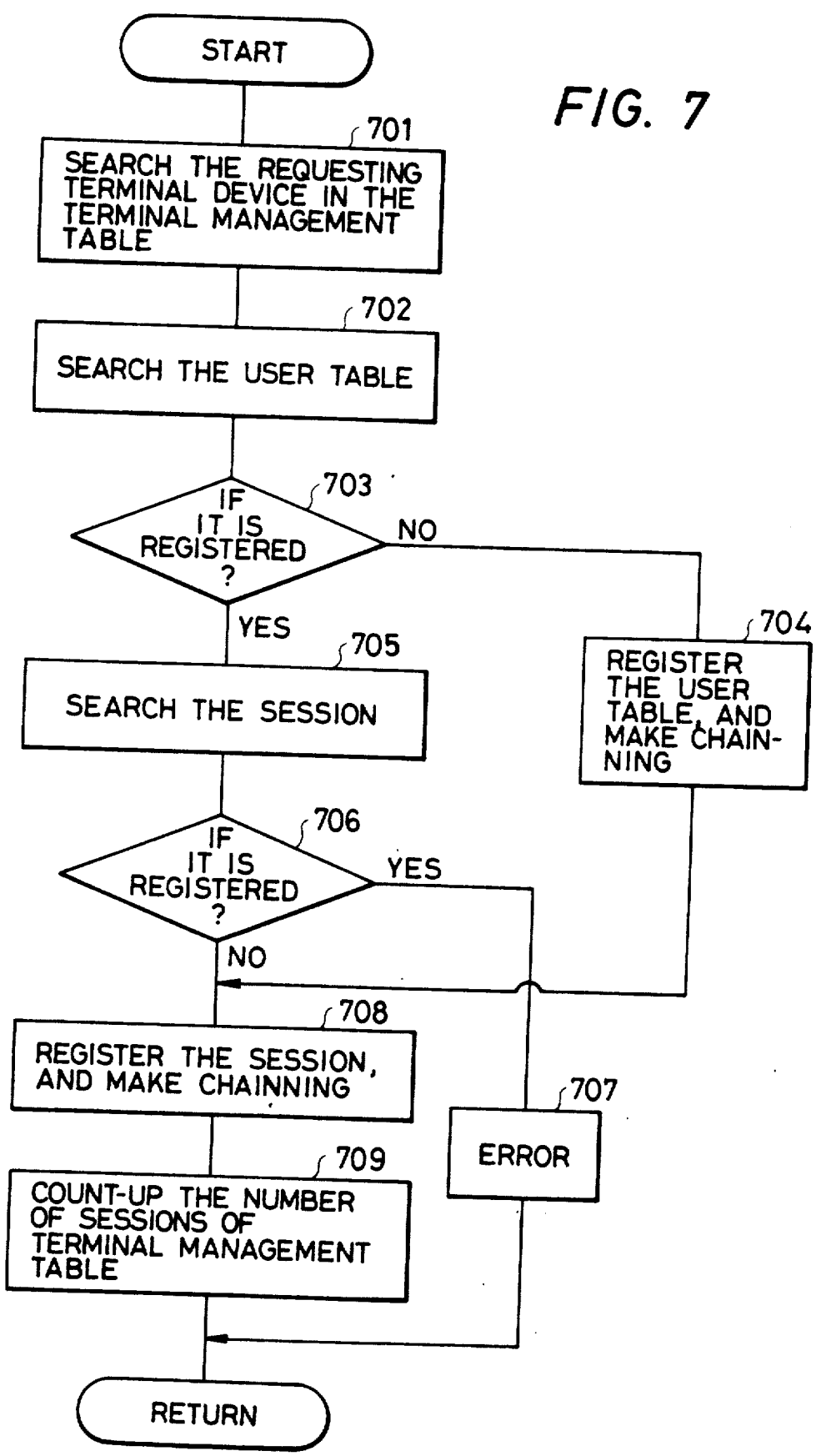
FIG. 7 is a flow chart showing the processing of session assignment.

The session alteration control is completed in the manner described above. Next, the opening of the session will be described. FIG. 7 shows the processing of the terminal control program when the session is opened. The operation starts when the request for opening is received from the conversational control program. The procedures up to the reception of the session opening request are the same as those of the session alteration.

When the opening request is received, the area of the terminal management table corresponding to the requesting terminal is searched (701). Next, the user table connected to the terminal device is searched, and the user table having the same user name as the given user name is searched (702). If the user table is already registered, the session table connected to the user table is searched (705) to examine whether the session table having the given session name exists (706). If the registration exists, it is an error (707), and if not, the session is registered anew and chaining is made from the user table (708). If the user table does not exist, it is made anew and chained (704). Then, the procedure shifts to step 708. Thereafter, the session number 66 of the area in the corresponding terminal management table is updated.

Though not shown in the drawings, when the session is registered, the conversational control program updates the session number corresponding to the user name of the user management table shown in FIG. 5.

Detailed description on the cancellation of the sessions will be omitted.

In the embodiment of the present patent described above, if an input-output operation occurs in the processing of a certain task, the user management table is searched by the conversational control program and the session control table storing the task ID representing that task is searched. Then, the session name corresponding to the task ID is searched. This table may be searched for each input-output operation, but in this embodiment, the correspondence between the task ID thus searched and the session name is stored in a memory in CPU and is used from the second processing and so forth.

Next, the session name thus searched is transferred to the terminal control program, where the terminal control table is searched. This search is to find out the session table to which the given session name is registered. The terminal device name of the area of the terminal management table to which the session table thus searched is connected is examined in order to know which terminal device the session uses. Therefore, the correspondence relation between the task and the terminal device is determined, and the input-output operation is made for this terminal device. Though the task ID and the session name has a fixed relation, the correspondence relation between the session name and the terminal device is variable in accordance with the present invention, so that the search of the terminal control table is made whenever the input-output operation is made.

In the manner described above, the correspondence relation between the task and the terminal device can be made variable.

According to the present invention, the session can be altered before the completion of the task and hence greater freedom can be obtained when using the terminal devices.

What is claimed is:

1. A session control method in an interactive processing system including a processor for executing a task while effecting input-output operations with a plurality of terminal devices, said processor having memory means for storing information indicating a corresponding relationship between said task and a terminal device and for effecting an input-output operation related to the execution of said task, said memory means includes a terminal management table having a plurality of areas each of which corresponds to a terminal device, first means for storing one or more sessions corresponding to one or more users, second means for storing data indicating a corresponding relationship between said areas and said users, third means for specifying one of said users ass being active for each of said terminal devices, and fourth means for specifying one of said sessions as being active for each of said users, said control method comprising steps of:
altering, by said processor said data indicating a corresponding relationship between said areas and said users stored in said second means based on an instruction from one of said terminal devices;
altering, by said processor, said specified user specified by said third means based on an instruction from one of said terminal devices;
altering, by said processor, said specified session specified by said fourth means based on an instruction from one of said terminal devices; and
executing, by said processor, said input-out operation with said terminal device indicated by said information indicating a corresponding relationship between said task and said terminal device during execution of said task.

2. A control method in an interactive processing system including a processor as defined in claim 1 further comprising the step of:
designating, by said processor, a session to be executed first for each of said terminal devices.

3. A control method in an interactive processing system including a processor as defined in claim 1 wherein said first means includes a user table provided for each user, and a session table for storing a session name and being chained to said user table, and said second means includes chaining means for designation a corresponding relationship between said area and said user table.

* * * * *